(12) United States Patent
Kubena et al.

(10) Patent No.: US 6,698,287 B2
(45) Date of Patent: Mar. 2, 2004

(54) MICROGYRO TUNING USING FOCUSED ION BEAMS

(75) Inventors: Randall L. Kubena, Oak Park, CA (US); Richard Joyce, Thousand Oaks, CA (US); Robert Thomas M'Closkey, Los Angeles, CA (US); A. Dorian Challoner, Manhattan Beach, CA (US)

(73) Assignees: The Boeing Company, Chicago, IL (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 10/285,886

(22) Filed: Nov. 1, 2002

(65) Prior Publication Data

US 2003/0101792 A1 Jun. 5, 2003

Related U.S. Application Data

(63) Continuation-in-part of application No. 09/928,279, filed on Aug. 10, 2001.

(51) Int. Cl.⁷ .............................................. G01C 19/00
(52) U.S. Cl. ...................................... 73/504.12; 73/1.77
(58) Field of Search ................................ 73/1.77, 1.82, 73/504.12, 504.02

(56) References Cited

U.S. PATENT DOCUMENTS

| | | |
|---|---|---|
| 392,650 A | 11/1888 | Watrous |
| 5,226,321 A | 7/1993 | Varnham et al. |
| 5,646,346 A | 7/1997 | Okada |
| 5,665,915 A | 9/1997 | Kobayashi et al. |
| 5,783,749 A | 7/1998 | Lee et al. |
| 5,894,090 A | 4/1999 | Tang et al. |
| 5,905,202 A | 5/1999 | Kubena et al. |
| 5,920,012 A | 7/1999 | Pinson |
| 6,009,751 A | 1/2000 | Ljung |
| 6,044,705 A | 4/2000 | Neukermans et al. |
| 6,164,134 A | 12/2000 | Cargille |
| 6,289,733 B1 | 9/2001 | Challoner et al. |
| 6,367,786 B1 | 4/2002 | Gutierrez et al. |
| 6,515,278 B2 * | 2/2003 | Wine et al. .................. 250/234 |

FOREIGN PATENT DOCUMENTS

| | | |
|---|---|---|
| DE | 44 42 033 A1 | 5/1996 |
| WO | WO 96/38710 | 12/1996 |
| WO | WO 98/15799 | 4/1998 |

OTHER PUBLICATIONS

D. Wright et al., "The HRG Applied to a Satellite Attitude Reference System," Guidance and Control, American Astronautical Society, Advances in Astronautical Sciences, 1994, 86:1–13.

(List continued on next page.)

Primary Examiner—Richard A. Moller
(74) Attorney, Agent, or Firm—Gates & Cooper LLP (57) ABSTRACT

The present invention discloses methods of manufacturing mechanical resonator microgyroscopes using focused ion beam machining and the mechanical resonator gyroscopes produced therefrom. An exemplary method of tuning a mechanical resonator gyroscope, includes the steps of mounting a mechanical resonator gyroscope in a vacuum chamber with a controllable focused ion beam where the gyroscope includes exciting and sensing elements for measuring a resonant frequency of the gyroscope. The exciting and sensing elements are activated to measure the resonant frequency of the mechanical resonator gyroscope and the resonant frequency of the gyroscope is adjusted to a desired resonant frequency value by controlling the focused ion beam to remove material of the gyroscope.

16 Claims, 4 Drawing Sheets

OTHER PUBLICATIONS

M.W. Purry et al., "A Micromachined Vibrating Ring Gyroscope," Solid State Sensor and Actuator Workshop, Transducer Research Foundation, Hilton Head, 1994, pp. 213–220.

T.K. Tang et al., "Silicon Bulk Micromachined Vibratory Gyroscope," Solid State Sensor and Actuator Workshop, Transducer Research Foundation, Hilton Head, South Carolina, Jun. 2–6, 1996, 6 pgs.

N. Barbour et al., "Micromechanical Silicon Instrument and Systems Development at Draper Laboratory," AIAA Guidance Navigation and Control Conference, American Institute of Aeronautics and Astronautics, San Diego, CA, Jul. 29–31, 1996, Paper No. 96–3709, pp. 1–7.

J.D. Johnson et al., "Surface Micromachined Angular Rate Sensor," A1995 SAE Conference Paper No. 950538, pp. 77–83.

* cited by examiner

MICROGYRO TUNING USING FOCUSED ION BEAMS

CROSS-REFERENCE TO RELATED APPLICATIONS

This continuation-in-part application claims the benefit under 35 U.S.C. Section 120 of the following co-pending and commonly-assigned U.S. utility patent application, which is incorporated by reference herein:

U.S. patent application Ser. No. 09/928,279, filed Aug. 10, 2001, and entitled "ISOLATED RESONATOR GYROSCOPE".

This application is related to co-pending U.S. patent application Ser. No. 10/286,375, filed on Nov. 1, 2002, and entitled "MICROELECTROMECHANICAL SYSTEM (MEMS) TUNING USING FOCUSED ION BEAMS". which is incorporated by reference herein.

STATEMENT OF GOVERNMENT RIGHTS

This invention was made with Government support awarded by the Government. The Government has certain rights in this invention.

BACKGROUND OF THE INVENTION

1. Field of the Invention

The present invention relates to microgyros and their methods of manufacture, particularly the structure and manufacturing methods for mechanical resonators in micro- and meso-gyro scopes.

2. Description of the Related Art

Miniature high grade mechanical resonators have a wide range of applications including micro- or meso-scale gyroscopes. Tuning is a critical portion of the manufacturing process of high grade mechanical resonators, particularly when the size of the resonator approaches a meso or micro scale. The rough manufacturing process of the resonator does not obtain acceptable precision. Generally, such tuning involves a selective 3D removal of material from the resonator in order to alter its physical properties and effect a change in the resonator behavior, e.g. a change in the natural frequency. This fine adjustment is used to obtain a very precise resonant frequency and/or a high Q balanced vibration of the resonator. Precision in the material removal process is essential.

For example, micromachining of axisymmetric silicon resonators for gyroscopes using deep reactive ion etching (DRIE) leaves a fixed residual resonant frequency mismatch of 0.1 to 1 Hz for mesoscale resonators and 10 to 30 Hz for mm scale microgyro resonators. One explanation for the limited results is that a fixed photo-mask is used in this process that affords no adjustment of the resonator in-situ. Furthermore, this process is also limited because it is very difficult to apply to an assembled gyroscope.

Gyroscope performance depends, in part, upon the frequency mismatch of the resonator. For example, gyroscope quadrature drift is proportional to the frequency mismatch of the resonator. Because navigation grade gyroscopes require high-Q resonators with milli- or micro-Hz matching of kHz resonances, the raw results of such DRIE micromachining processes (producing frequency mismatch over 1 Hz) is unacceptable. Additional processes to tune the resonator are necessary.

Tuning with laser assisted gas etching or laser ablation after the micromachining process has been used, but the precision of these processes does not yet produce acceptable results for many applications. In addition, gas reaction products or debris liberated during these processes may damage the resonator or assembled gyroscope. Furthermore, gases may also damp the resonance, distorting any-in-situ measurement. Although tuning precision is critical, the selected tuning process must also be compatible with the materials and structure of the resonator.

For some resonators, such as capacitive gyroscopes, electrostatic bias trimming can be used to induce an unbalanced electrostatic spring softening to adjust one or more resonance frequencies. However, this technique is subject to electrical errors and thermal tracking of mechanical and electrical errors.

There is a need for methods of manufacturing mechanical resonators with very high mechanical precision. There is further a need in the art for such manufactured mechanical resonators in applications such as microgyros with greatly improved performance for navigation. The present invention meets these needs.

SUMMARY OF THE INVENTION

It should be noted that throughout this specification, the invention will be described in relation to meso- or microgyroscopes. Although the invention may be more desirable for smaller gyros (where even small changes in the resonator have a greater performance impact), the size scale of the resonator does not determine the applicability. The invention can be applied to any mechanical resonator requiring high precision, based upon the desired gyro performance.

Embodiments of the invention perform a novel "nanomachining" method for tuning mechanical resonators that includes other beneficial properties over related tuning processes. An exemplary method includes mounting a mechanical resonator with means for exciting and sensing its resonant frequency in a vacuum chamber along with a focused ion beam. The resonant frequency is then adjusted to a desired resonant frequency value using the focused ion beam to remove very small amounts of material at a sufficiently slow rate to controllably change the dimension of the resonator at a sensitive location, e.g. the resonator flexure beam thickness.

Such a method has application in producing navigation grade vibratory gyroscopes achieving below parts-per-million tuning precision of their resonance frequencies. Furthermore, because the focused ion beam process is benign to the resonator materials and structure, the built-in narrow gap electrostatic actuators and sensors of the gyroscope can be used in the tuning process.

Selection of the appropriate sensitive locations for material removal (and approximate amount of material to remove) can be determined by a finite element model analysis of the normal modes of the mechanical resonator. The finite element model analysis should have sufficient resolution to represent the structural modes before and after a proposed quantity of material is removed.

Embodiments of the invention enable a very high-resolution adjustment of an individual mechanical resonator frequency or the relative frequencies of a multi-resonance device such as in a vibratory microgyroscope. In addition, embodiments of the invention can be performed on assembled devices and in a vacuum chamber using routine electronic or optical stimuli and sensing methods allowing continuous in-situ re-adjustment, without need to break the chamber vacuum. A key feature of present invention lies in the in-situ application where FIB parameters can be adjusted in response to real time monitoring of the gyro performance, e.g. frequency splits; the gyro operates while the tuning adjustments (FIB micromachining) are taking place.

Embodiments of the invention are particularly useful in navigation applications that use precisely tuned mechanical resonators, e.g. vibratory gyroscopes.

Employing the present invention, new microgyros having a drift performance of 0.1 to 0.01 deg/hr can be made. Furthermore, the performance of existing microgyros can be improved to a threshold level required for space applications, e.g. approximately 0.1 deg/hr. For example, the cloverleaf microgyro of U.S. Pat. No. 5,894,091, which is incorporated by reference herein, or various tuning fork rate sensors can benefit from the present invention.

Embodiments of the invention provide an affordable tuned vibratory gyroscope with navigation grade performance by means of a precision isolated symmetric planar resonator of optimum scale that can be fabricated with silicon photolithography from commercial double-side polished silicon wafers with low total thickness variation. Previous navigation grade vibratory gyroscopes with isolated resonators have relied on conventional lathes or milling machines yielding slow and expensive 3D precision machining and assembly, e.g. quartz hemispheric resonator gyroscopes, or employed non-isolated resonators mounted on low-frequency isolators to gain a degree of isolation at the expense of increasing seismic suspension mass and increased deflections due to gravity loads. Asymmetric tuning fork vibratory gyroscopes provide isolation about the drive axis only and are subject to external disturbance about the output sense axis. The cloverleaf microgyroscope of U.S. Pat. No. 5,894,091 as previously mentioned is subject to external disturbances about its drive and output axes.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

Tuning is a critical portion of the manufacturing process of small-scale high performance mechanical resonators, such as used in microgyros. Generally, tuning involves a selective removal of material from the resonator to effect change in the natural frequency of the resonator. This adjustment is used to achieve a precise frequency and/or a high Q balanced vibration of the resonator. Precision in the material removal process is essential. In addition, the tuning process must also be compatible with the materials and structure of the resonator.

2.0 Problems with Related Art

Previously, resonator tuning has employed laser energy beams to either ablate resonator material directly or to assist a chemical reaction of the resonator material with a surrounding gas for removal of the material from selected locations of a mechanical resonator. Laser ablation of a small deposited gold layer has also been used to adjust the natural frequency of piezoelectric quartz tuning forks for watches and gyroscopes. Laser beam energy has also been applied to a 30 mm fused quartz hemispherical resonator to remove rim mass at selected locations for tuning and balancing the two orthogonal shell vibration modes for vibratory gyroscopes.

However, there is a significant practical problem with using laser beam energy for resonator mass removal for small hemispherical resonators or other assembled resonators, particularly those utilizing small capacitance gaps, e.g. 10 to 15 micron. Debris of the laser ablation or chemical reaction products from the laser assisted etching either obstructs the small gap or damages the capacitance electrodes. For example, when the silicon flexures of a cloverleaf microgyroscope were etched using a gas-assisted laser etching system, the process resulted in a damaging green film deposit on the gold electrodes underneath the cloverleaf resonator. In addition, the presence of gas during laser assisted etching also lowers the resonator Q and limit frequency measurement accuracy while laser ablation will result in significant debris and imprecision.

3.0 Focused Ion Beam Tuning

As used in the present invention, a focused ion beam is employed for the removal of material from a mechanical resonator for the purpose of modifying or tuning its resonant frequencies so that the limitations of the related art are eliminated. It does not require a gas or chemical reaction that limits resonator Q or that corrodes the gold electrodes and it does not require pulses of high radiant energy that is imprecise and scatters large amounts of debris. For assembled vibratory gyroscopes which normally have built-in means to drive and sense two mechanical resonances that operate in a vacuum, a focused ion beam has sufficient spatial resolution and a sufficiently low mass removal rate to enable a controlled tuning rate.

Figure 1:
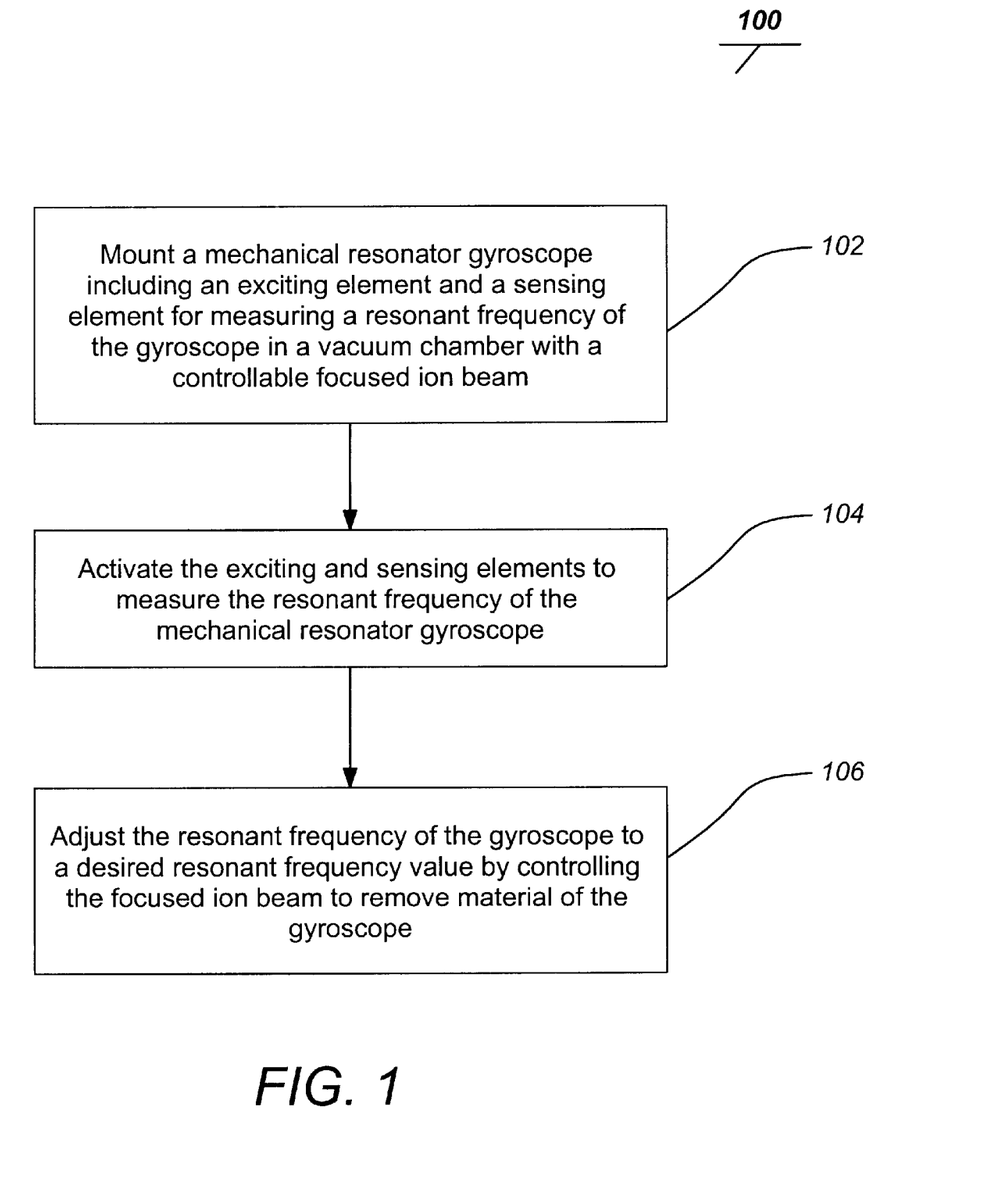
FIG. 1 is a flowchart of a typical method of using the invention.

FIG. 1 is a flowchart of an exemplary method of the invention. The exemplary method 100 begins at block 102 where a mechanical resonator including an exciting element and a sensing element for producing its resonant frequency is mounted in a vacuum chamber with a controllable focused ion beam. The exciting and sensing elements can typically be electrodes (e.g., gold electrodes), used to operate the resonator. In addition, the exciting and sensing elements can have very small capacitance gaps (e.g., less than approximately 15 microns). At block 104, the exciting and sensing elements are activated to measure the resonant frequency of the mechanical resonator. Then at block 106, the resonant frequency of the resonator is next adjusted to a desired resonant frequency value using the focused ion beam to remove very small amounts of material at a sensitive location of the resonator, e.g. the resonator flexure beam thickness. The focused ion beam removal is performed at a sufficiently slow rate so that the change in the resonant frequency can be monitored.

Such a method has application in producing navigation grade vibratory gyroscopes achieving below parts-per-million tuning precision of their resonance frequencies. Furthermore, because the focused ion beam process is benign to the resonator materials and structure, the built-in narrow gap electrostatic actuators and sensors (exciting and sensing elements) of the gyroscope can be used in the tuning process.

4.0 Resonator Modeling

Guiding the material removal by the focused ion beam is also an important consideration. It is well known in the art of mechanical design and analysis that the small vibrations of an elastic structure occur at definite frequencies called natural modes of vibration or resonances. Cantilever beams, tuning fork resonators, shell resonators and the like possess modes of vibration that can be accurately predicted by a mathematical model of the structure or determined by actual construction and measurement. Embodiments of the present invention can use mathematical modeling to direct the tuning process.

In general, a mathematical model commonly employed in structural design is a system of linear ordinary differential equations derived from a mechanical principle and solved using a numerical method such as finite element modeling (FEM). A purely elastic structural model without dissipation is well known to accurately model high Q resonators since slight dissipation has a generally negligible effect on natural frequency. Commercially available computer software, e.g. NASTRAN, can be conveniently used for this purpose.

Embodiments of the present invention can use a series of simple beam and plate (triad or quad) elements, to model the overall structure of the mechanical resonator. A set of points in space or nodes defines the location and extent of these elements. As the number of these discrete elements is increased a more accurate prediction of the continuous physical model is obtained. Convergence for simple mode shapes, e.g. first cantilever mode, is reached with relatively few elements. A common analysis performed with finite element modeling is a normal modes analysis to determine the eigenvalue (natural frequency) and eigenvector (mode shape) of each mode. The percent of elastic strain energy in each finite element and the relative displacement at each nodal point are typical outputs of a finite element modeling normal modes analysis.

An element with high strain energy density signifies that the elasticity of that element contributes more significantly to the natural frequency of the mode. If that element is a beam element in bending with little displacement, e.g. at the root of a long cantilever beam, then a small reduction of its height or width will lower its bending stiffness and hence tend to reduce the cantilever mode natural frequency. Alternatively, if an element is moving with high displacement and low strain, e.g. a beam element at the tip of a long cantilever beam, then reduction of its height or width will reduce the tip mass and hence tend to increase the cantilever mode natural frequency.

5.0 Exemplary Mesogyro

Figure 2A:
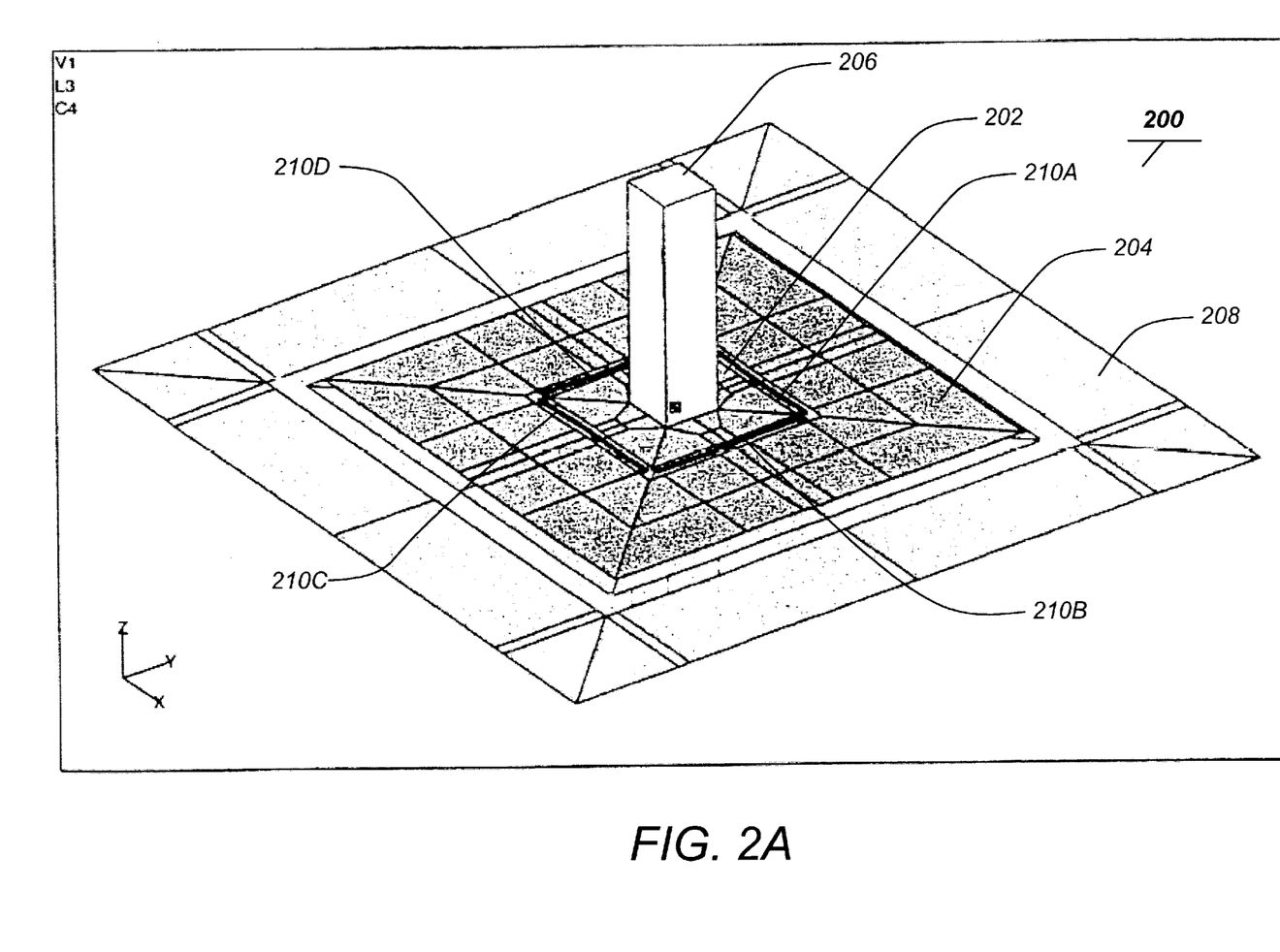
FIG. 2A illustrates a finite element model of a mesogyro resonator produced under a typical manufacturing process of the invention.
Figure 2B:
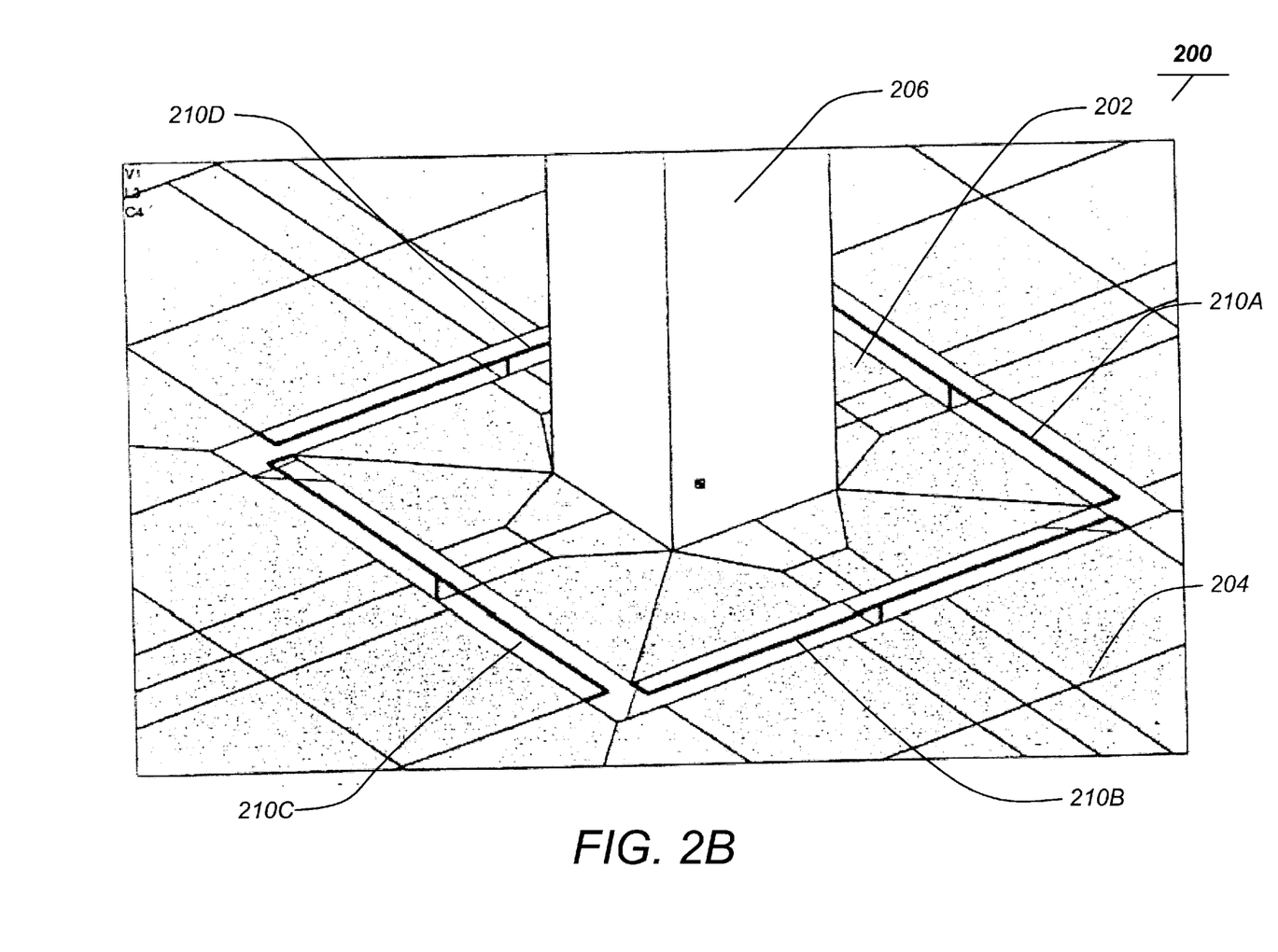
FIG. 2B illustrates a close up view of the finite element model of a mesogyro resonator showing the four resonator beams.

FIGS. 2A–2B illustrate a finite element model of a mesogyro resonator 200 produced under a typical manufacturing process of the invention. FIG. 2A illustrates a mesogyro resonator 200 comprising inner and outer resonator plates 202, 204, a post 206, fixed to inner resonator plate 202, and a baseplate 208. The inner and outer resonator plates 202, 204 are linked to each other and the baseplate 208 through four resonator beams 210A–210D. FIG. 2B illustrates a close up view of the resonator showing the four resonator beams 210A–210D. Each beam 210 is connected at its ends to the inner and outer resonator plate and at its middle to the baseplate 208 below. The inner and outer resonator plates 202, 204 can be produced from silicon (e.g. by rough micromachining). The post 206 can similarly be produced from silicon or alternately from PYREX (and installed into the silicon inner plate 202). In addition, the mesogyro includes exciting and sensing elements (such as capacitive electrodes) disposed on the resonator (inner and/or outer plates 202, 204) and baseplate 208. These elements are used to operate the mesogyro in practice, as well as tune the device during manufacturing.

Per the example of FIGS. 2A and 2B, focused ion beam milling for mechanical tuning of a resonator can be applied to a capacitive silicon MEMS microgyro. The thin epitaxial silicon beam thickness variations and rough micromachining errors yield typically 20 to 30 Hz of mis-tuning between the two 3 kHz rocking modes, however, a frequency split of less than approximately 1 Hz is required for low noise operation or electrostatic capture with a four-electrode design. Formerly, crude plasma etching using a fixed shadow mask had been attempted to yield only a few tuned devices. From finite element modeling it can be determined that the strain energy for the two rocking modes is concentrated in the four silicon beam flexures (e.g. beams 210A–210D). Hence, trimming the beams of a sample cloverleaf microgyroscope (e.g. U.S. Pat. No. 5,894,091) demonstrates that focused ion beam tuning of the two rocking mode frequencies is practical.

A vibratory gyroscope comprises one or more mechanical resonators. Navigation grade gyroscopes often employ an axisymmetric mechanical resonator having two closely-tuned vibratory modes about a drive axis and about a sense axis. Fabrication error leading to dissipative unbalance (in-phase error) and elastic unbalance (quadrature error) is the primary source of drift in a vibratory gyroscope. Parts per million symmetry would be desirable for navigation grade gyroscopes but only 10,000 ppm (correlating to a 30 Hz split in 3000 Hz resonance) is typically achieved with MEMS micromachining, while 333 ppm (correlating to a 1 Hz split in 3000 Hz resonance) can be achieved with mesoscale micromachining.

The exemplary mesogyro comprises an outer silicon plate 204 and inner post 206 attached to an inner silicon plate 204 to form a resonator 200 that is attached to a common electrode baseplate 208 via thin elastic beams 210A–210D as describe above. The resonator 200 possesses two differential rocking modes having theoretically identical frequencies but, in practice, silicon micromachining errors result in different frequencies. Built-in electrostatic exciting and sensing elements (on the inner and/or outer plate 202, 204 and baseplate 208) can be used for tuning while using focused ion beam machining.

For example, to evaluate the utility of focused ion beam machining of a mesoscale silicon resonator gyroscope, the finite element model illustrated in FIGS. 2A–2B was constructed. The central beam flexures are nominally 500 micron high and 500 micron wide and each beam 410 length (approximately 7 mm total length) comprises several shorter beam elements in the model. To establish the utility of focused ion beam machining a new beam property was defined, having a height of approximately 499 microns representing removal of 1 micron of material from the nominal design as can be performed by focused ion beam milling in about an hour (depending on the length of the beam element). The fixed operating area of a typical focused ion beam system is approximately a 500 micron square.

Figure 2C:
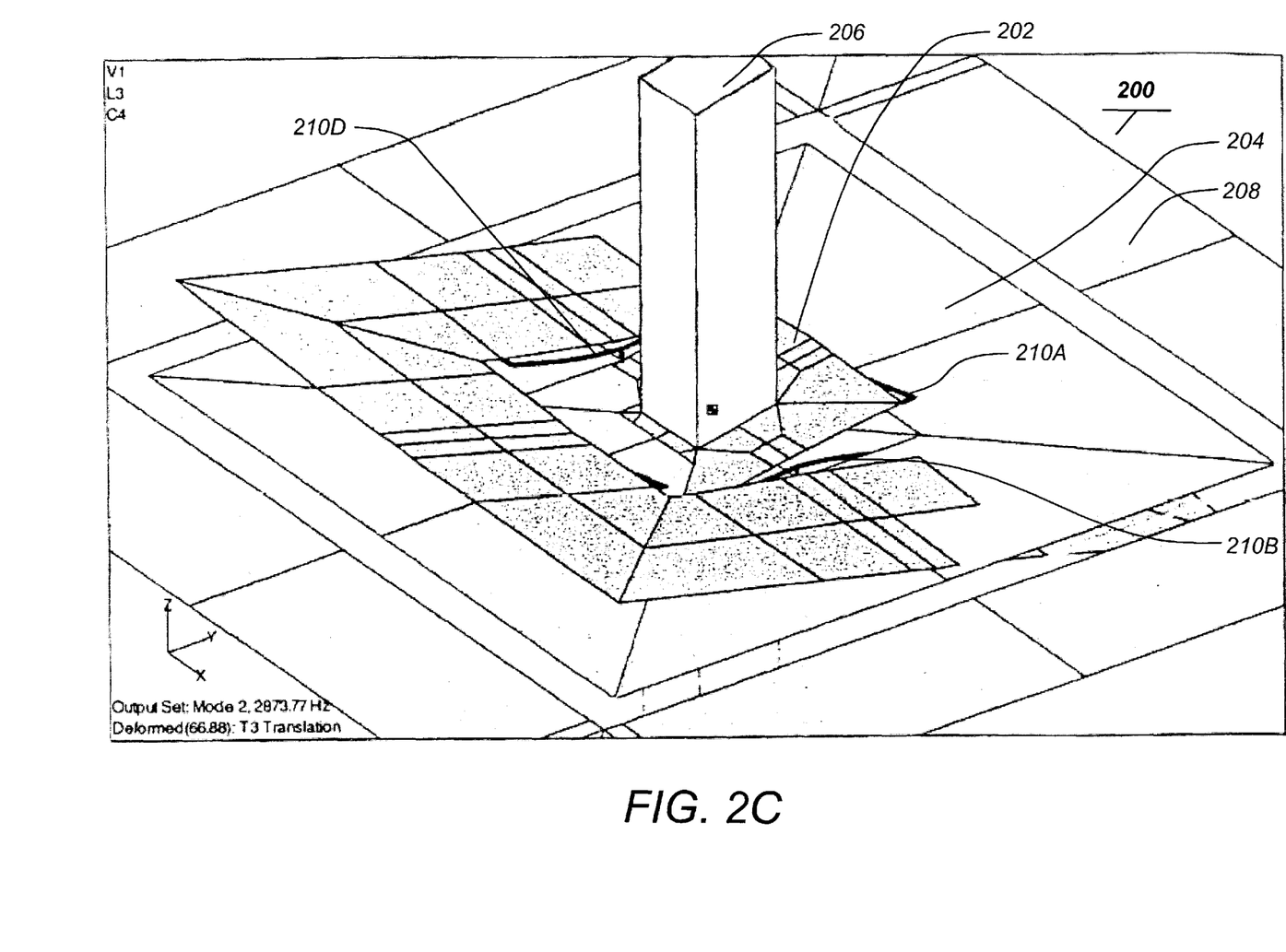
FIG. 2C illustrates the rocking mode about the X axis for the exemplary mesogyro resonator.

FIG. 2C illustrates the rocking mode about the X axis for the exemplary mesogyro resonator 200. From a normal mode analysis of the two differential rocking modes it can be determined that the beam strain energy is more concentrated at the middle portion of the beams 410 where they attach to the baseplate 208. Further, for the rocking mode about the X axis, as shown in FIG. 2C, the strain energy for the midbeam portion on the Y axis was higher than for the portion on the X axis. The total beam length on each side was approximately 7.1 mm. With the central beam portion of the finite element model refined to comprise two 0.9 mm beam elements the percent of strain energy was found to be 10.5% in the beam elements on the Y axis versus 6.5% on the right X axis.

Two normal mode analyses were performed. The first, with nominal beam properties, yielded rocking mode frequencies of approximately 2873.77 Hz (about X-axis) and 2873.73 Hz (about Y-axis). (A slight increase in beam width <<0.1 micron for the two beams parallel to the Y axis was used to ensure near degenerate rocking modes that would be aligned with the geometric axes.) The second normal mode analysis simulated the focused ion beam removal of 1 micron from the two 1.8 mm beam segments centered-on the Y axis. Such an operation can take a few hours, depending on focused ion beam operating parameters. The resulting rocking mode frequencies reduced to approximately 2872.006 Hz (X-axis) and 2872.645 Hz.(Y-axis). The X-axis rocking frequency was thus reduced by 1.8 Hz while the Y-axis rocking mode frequency was reduced by 1.1 Hz. This 0.7 Hz difference in frequency reductions establishes the usefulness of focused ion beam machining to modify the relative values of the mesogyro rocking mode frequencies and thereby correct typical initial micromachining errors of less than approximately 1 Hz split. This establishes adequate sizing of the focused ion beam machining process for tuning micromachined resonators.

For example, if the initial X-axis rocking frequency is higher than the Y-axis frequency then focused ion beam machining (or nanomachining) can begin by machining the beam segments centered on the Y-axis. Otherwise, focused ion beam machining can be initiated on the beam segments over the X-axis. Continuous monitoring of the two rocking mode frequencies as the focused ion beam material removal progresses enables the process to be halted with less than an approximately a 30 mHz frequency split for a 3 kHz resonator with Q greater than 100,000.

The foregoing is not meant as an exhaustive prescription, but merely a demonstration of the feasibility and effectiveness of modifying the frequency of a mechanical resonator using focused ion beam milling to change its dimension at a sensitive location. Simple physical reasoning could also be employed to select initial milling location. Other milling locations, such as the resonator plate edge or post tip, can also be evaluated under analogous analysis and modeling. Further finite element model analysis of more general machining errors, e.g. rocking axis misalignment and other machining scenarios, can be performed to optimize the effectiveness of the focused ion beam nanomachining in reducing rocking mode frequency splits.

The practical ability of focused ion beam nanomachining to modify mechanical resonator frequencies has been disclosed. Removal of a narrow section of one of a silicon resonator's beams can be used to bring the rocking mode frequencies closer together without damage to the microgyroscope as evidenced by its ability to continuously operate during the focused ion beam machining. A capacitance gap as small as only 8 microns is operable during focused ion beam operation without evidence of debris related disturbance. A finite element model similar to that developed for the mesogyro can be used to guide the focused ion beam machining by defining the most effective areas of the resonator beams from which to remove material to tune the two rocking modes after rough micromachining.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the use of the invention. Since many embodiments of the invention can be made without departing from the scope of the invention, the invention resides in the claims hereinafter appended.

What is claimed is:

1. A method of tuning a mechanical resonator gyroscope, comprising the steps of:

mounting a mechanical resonator gyroscope in a vacuum chamber with a controllable focused ion beam where the gyroscope includes an exciting element and a sensing element for measuring a resonant frequency of the gyroscope;

activating the exciting and sensing elements to measure the resonant frequency of the mechanical resonator gyroscope; and adjusting the resonant frequency of the gyroscope to a desired resonant frequency value by controlling the focused ion beam to remove material of the gyroscope.

2. The method of claim 1, wherein the mechanical resonator gyroscope comprises silicon.

3. The method of claim 1, wherein the mechanical resonator gyroscope is formed by micromachining.

4. The method of claim 1, wherein the exciting and sensing elements comprise capacitive electrodes.

5. The method of claim 1, wherein the resonant frequency of the gyroscope is measured and adjusted simultaneously.

6. The method of claim 1, wherein the material removal by the focused ion beam is performed at a sufficiently slow rate so that a change in the resonant frequency can be measured.

7. The method of claim 1, wherein the material is removed from an area of the gyroscope determined from finite element modeling analysis.

8. The method of claim 1, wherein the material is removed from a flexure beam thickness of the gyroscope.

9. A mechanical resonator gyroscope manufactured by the steps of:

mounting a mechanical resonator gyroscope in a vacuum chamber with a controllable focused ion beam where the gyroscope includes an exciting element and a sensing element for measuring at least one resonant frequency of the gyroscope;

activating the exciting and sensing elements to measure the resonant frequency of the mechanical resonator gyroscope; and adjusting the resonant frequency of the gyroscope to a desired resonant frequency value by controlling the focused ion beam to remove material of the gyroscope.

10. The mechanical resonator gyroscope of claim 9, wherein the mechanical resonator gyroscope comprises silicon.

11. The mechanical resonator gyroscope of claim 9, wherein the mechanical resonator gyroscope is produced by micromachining.

12. The mechanical resonator gyroscope of claim 9, wherein the exciting and sensing elements comprise capacitive electrodes.

13. The mechanical resonator gyroscope of claim 9, wherein the resonant frequency of the gyroscope is measured and adjusted simultaneously.

14. The mechanical resonator gyroscope of claim 9, wherein the material removal by the focused ion beam is performed at a sufficiently slow rate so that a change in the resonant frequency can be measured.

15. The mechanical resonator gyroscope of claim 9, wherein the material is removed from an area of the gyroscope determined from finite element modeling analysis.

16. The mechanical resonator gyroscope of claim 9, wherein the material is removed from a flexure beam thickness of the gyroscope.

* * * * *

UNITED STATES PATENT AND TRADEMARK OFFICE
CERTIFICATE OF CORRECTION

| | |
|---|---|
| PATENT NO. | : 6,698,287 B2 |
| APPLICATION NO. | : 10/285886 |
| DATED | : March 2, 2004 |
| INVENTOR(S) | : Kubena et al. |

It is certified that error appears in the above-identified patent and that said Letters Patent is hereby corrected as shown below:

Col. 1 lines 21-22, cancel the text "This invention was made with Government support awarded by the Government" and insert the following:

--This invention was made with Government support under Grant No. 9985046 awarded by the National Science Foundation.--

Signed and Sealed this

Thirteenth Day of April, 2010

David J. Kappos
*Director of the United States Patent and Trademark Office*